(12) United States Patent  
Kitscha

(10) Patent No.: US 8,690,647 B1  
(45) Date of Patent: Apr. 8, 2014

(54) FIELD DRESSING ATTACHMENT FOR A HUNTING KNIFE

(71) Applicant: John J. Kitscha, Brookfield, WI (US)

(72) Inventor: John J. Kitscha, Brookfield, WI (US)

( * ) Notice: Subject to any disclaimer, the term of this patent is extended or adjusted under 35 U.S.C. 154(b) by 0 days.

(21) Appl. No.: 14/084,650

(22) Filed: Nov. 20, 2013

(51) Int. Cl.
*A22B 5/16* (2006.01)

(52) U.S. Cl.
USPC .......................................................... 452/132

(58) Field of Classification Search
USPC .................................. 452/125, 132, 102–105
See application file for complete search history.

(56) References Cited

U.S. PATENT DOCUMENTS

| | | | | |
|---|---|---|---|---|
| 2,650,424 A | * | 9/1953 | Kalmon | 30/286 |
| 4,215,470 A | * | 8/1980 | Chirichigno | 30/90.8 |
| 4,601,102 A | * | 7/1986 | Phillips | 30/123.5 |
| 4,607,432 A | * | 8/1986 | Montgomery | 30/294 |
| 4,707,920 A | * | 11/1987 | Montgomery | 30/294 |
| 4,763,416 A | * | 8/1988 | Copeland | 30/294 |
| 4,937,941 A | * | 7/1990 | Crist | 30/294 |
| 5,046,253 A | * | 9/1991 | Ireland | 30/289 |
| 6,076,261 A | * | 6/2000 | Eriksson et al. | 30/151 |
| 6,249,973 B1 | * | 6/2001 | Hirano | 30/30 |
| 6,263,581 B1 | * | 7/2001 | Forte | 30/332 |
| 6,371,844 B1 | * | 4/2002 | Holler | 452/132 |
| 6,964,100 B1 | * | 11/2005 | Musland | 30/286 |
| 7,874,235 B2 | * | 1/2011 | Dittly | 83/13 |

* cited by examiner

*Primary Examiner* — Richard Price, Jr.
(74) *Attorney, Agent, or Firm* — Donald J. Ersler

(57) ABSTRACT

A field dressing attachment for a hunting knife preferably includes a support plate, an end hook, a bottom gusset and a finger ring. One end of the support plate is terminated with the end hook. The bottom gusset extends downward from a bottom of the support plate. The finger ring extends from the bottom gusset and is located at an opposing end of the support plate. A blade groove is formed in the support plate to receive a non-cutting edge of a knife blade. A tip cavity is formed in the end hook. A tip of the knife blade is inserted into the tip cavity. A user's finger is inserted through the finger ring and a remainder of the hand is wrapped around a handle of the knife. The forefinger is used to keep the tip of the knife blade in the tip cavity.

19 Claims, 3 Drawing Sheets

FIELD DRESSING ATTACHMENT FOR A HUNTING KNIFE

BACKGROUND OF THE INVENTION

1. Field of the Invention

The present invention relates generally to field dressing game and more specifically to a field dressing attachment for a hunting knife, which allows a hunting knife to be adapted for dressing game.

2. Discussion of the Prior Art

When an animal such as a deer has been harvested by hunting, it needs to be field dressed to remove the internal organs. This is normally done within a few hours of the animal being harvested. However, there are times when the animal is not recovered immediately and therefore cannot be field dressed, until it is recovered, which could be the next day.

The process of field dressing an animal requires cutting open the abdomen in order to remove all of the internal organs. In order to cut open the abdomen the hide and abdomen muscle tissue must be cut along the entire length of the abdomen. The process of cutting open the abdomen can be difficult and result in possible injury to the person performing the process. During the process of cutting open the abdomen, it is very easy to accidentally cut open part of the intestinal track and/or stomach wall. This happens because these organs build up digestive gas very quickly after the animal is deceased and are under pressure to expand. When the abdominal cavity has been partially cut open the internal organs will start to protrude from the cut in the abdomen, as the result of the gas pressure in the internal organs.

It is common practice for the person performing the field dressing to use a hand and/or fingers to help try to compress the intestines or stomach and move them out of the way. However, this can be very difficult in low light conditions and often results in either a puncture of these organs or a laceration to the hand or finger of the person performing this process. When the intestines or stomach are punctured the digestive fluids will leak out into the chest cavity of the animal. When this happens, it is very common for bacteria to grow very rapidly in the chest cavity, especially in warm weather conditions and can result in the loss of usable meat from the animal. Furthermore, the bacteria can cause a laceration on the finger or hand to become infected or result in the possible transmission of disease from the animal.

U.S. Pat. No. 4,707,920 to Montgomery discloses a knife with retractable point protector. U.S. Pat. No. 6,964,100 to Musland discloses a knife guard. U.S. Pat. No. 7,874,235 to Dittly discloses a game field dressing safety tool.

Accordingly, there is a clearly felt need in the art for a field dressing attachment for a hunting knife, which allows a hunting knife to be adapted for dressing game; is firmly and positively retained relative to the hunting knife with a hand; and does not allow a user to injure himself during use.

SUMMARY OF THE INVENTION

The present invention provides a field dressing attachment for a hunting knife, which is firmly and positively retained relative to the hunting knife with a hand. The field dressing attachment for a hunting knife preferably includes a support plate, an end projection, a bottom gusset and a finger ring. One end of the support plate is terminated with the end projection. The bottom gusset extends downward from a bottom of the support plate and preferably extends a length of the support plate. The finger ring extends from the bottom gusset and is located at an opposing end of the support plate. A blade groove is formed in a top of the support plate to receive a non-cutting edge of a knife blade. A tip cavity is formed in the end projection. The tip cavity communicates with the blade groove.

In use, a tip of the knife blade is inserted into the tip cavity. A user's forefinger is inserted through the finger ring and hooked around the finger ring and the remainder of the user's hand is wrapped around a handle of the knife. The handle of the knife is drawn against an opposing end of the support plate by the forefinger, which results in the non-cutting edge of the knife blade being retained in the blade groove. The field dressing attachment for a hunting knife is now ready for use for field dressing game, such as a deer.

Accordingly, it is an object of the present invention to provide a field dressing attachment for a hunting knife, which allows a hunting knife to be adapted for dressing game.

It is a further object of the present invention to provide a field dressing attachment for a hunting knife, which is firmly and positively retained relative to the hunting knife with a hand.

Finally, it is another object of the present invention to provide a field dressing attachment for a hunting knife, which does not allow a user to injure himself during use.

These and additional objects, advantages, features and benefits of the present invention will become apparent from the following specification.

DETAILED DESCRIPTION OF THE PREFERRED EMBODIMENTS

Figure 1:
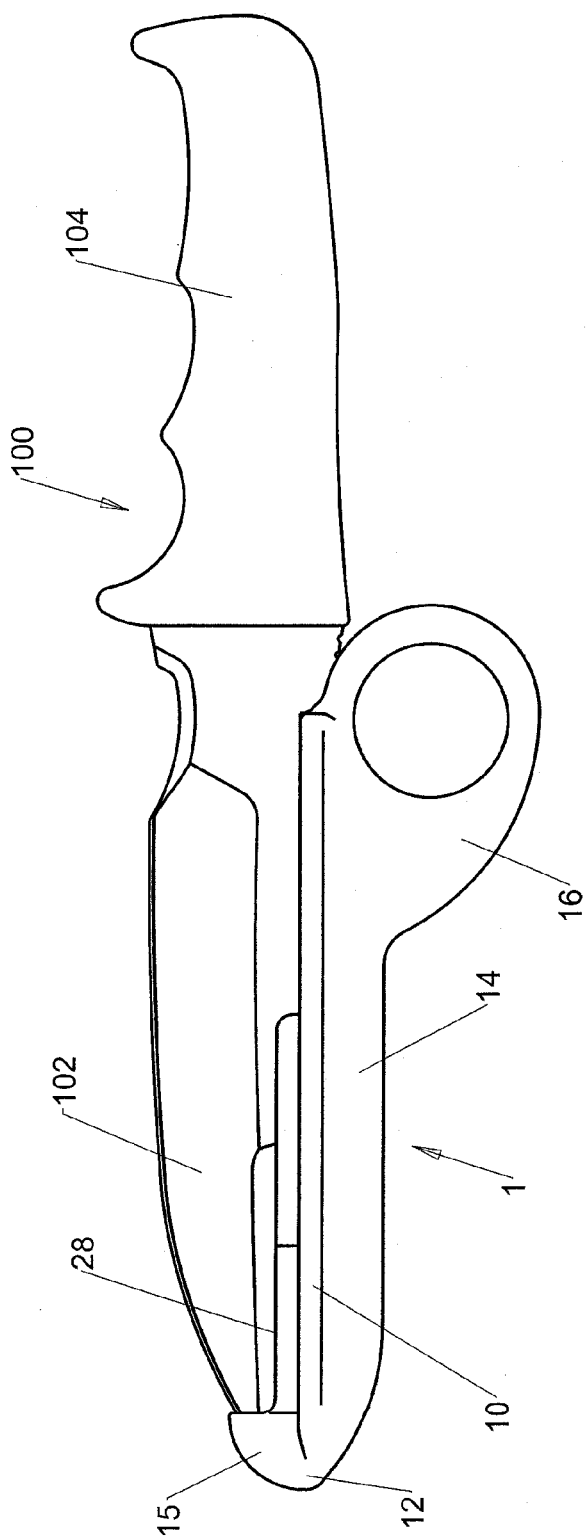
FIG. 1 is a side view of a hunting knife inserted into a field dressing attachment for a hunting knife in accordance with the present invention.
Figure 2:
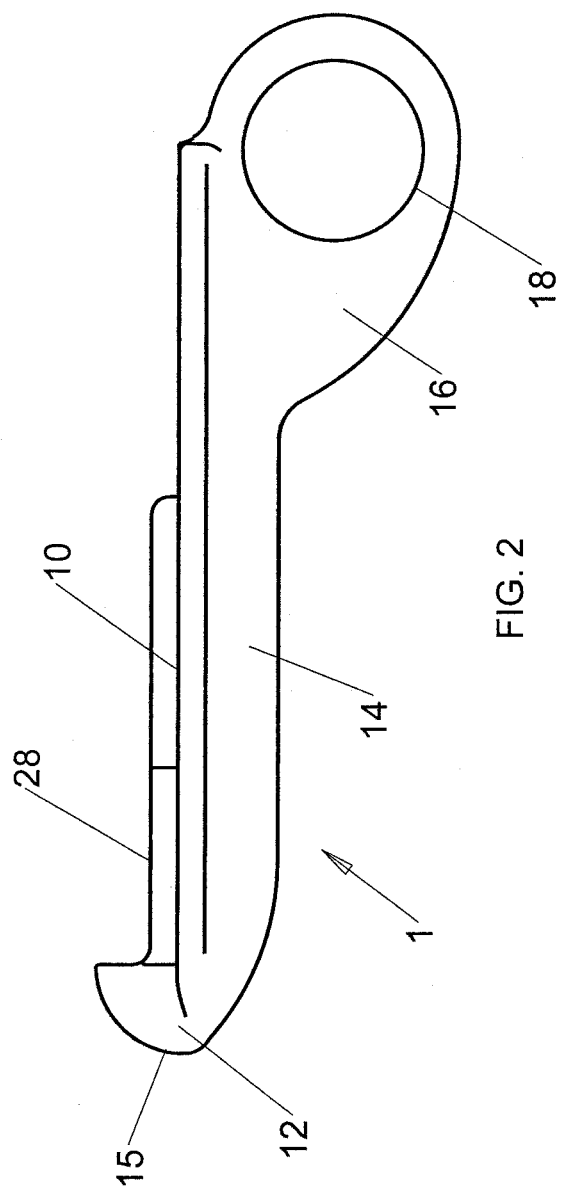
FIG. 2 is a side view of a field dressing attachment for a hunting knife in accordance with the present invention.
Figure 4:
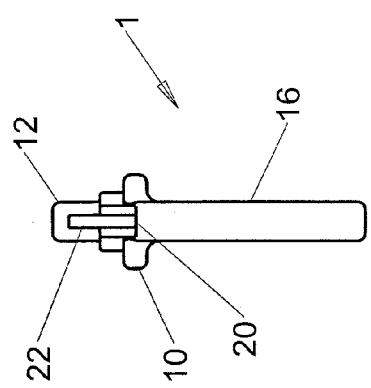
FIG. 4 is an end view of a field dressing attachment for a hunting knife in accordance with the present invention.
Figure 3:
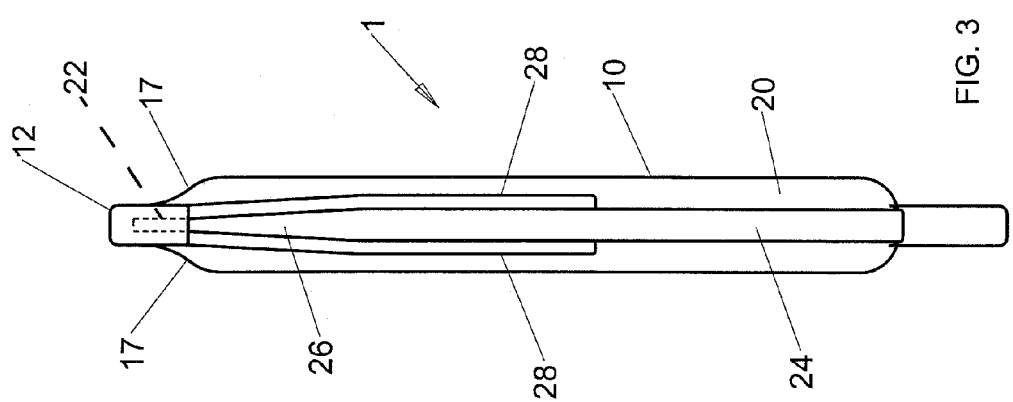
FIG. 3 is a top view of a field dressing attachment for a hunting knife in accordance with the present invention.

With reference now to the drawings, and particularly to FIG. 1, there is shown a side view of a hunting knife 100 inserted into a field dressing attachment for a hunting knife 1. With reference to FIGS. 2-4, the field dressing attachment for a hunting knife 1 preferably includes a support plate 10, an end projection 12, a bottom gusset 14 and a finger ring 16. One end of the support plate 10 is terminated with the end projection 12. The bottom gusset 14 extends downward from a bottom of the support plate 10 and preferably extends a length of the support plate 10. A front portion 15 of the end projection 12 is preferably curved. The finger ring 16 extends from the bottom gusset 14 and is located at an opposing end of the support plate 10. Each side of a front portion 17 of the support plate 12 is chamfered or curved. The finger ring 16 includes a finger opening 18.

A blade groove 20 is formed in a top of the support plate 10 to receive a non-cutting edge of a knife blade 102 of a knife 100. However, the blade groove 20 may be replaced with a pair of projections, which extend upward from the support plate 10 or any other suitable device for preventing sideways movement of the knife blade relative to the support plate 10. A tip cavity 22 is formed in the end projection 12 and is sized to receive a tip of the knife blade 102. The blade groove 20 preferably includes a straight section 24 and a tapered section 26. One end of the tapered section 26 extends from the straight section 24. The other end of the tapered section 26 merges into a width of the tip cavity 22.

Preferably, a pair of retention tabs 28 extend upward from a top of the support plate 10. An inside surface of the pair of retention tabs 28 are preferably flush with opposing sides of the blade groove 20. The pair of retention tabs 28 extend a length of the tapered section 26 and part of a length of the straight section 24. The pair of retention tabs 28 prevent radial movement of the knife blade 102 relative to the support plate 10. The field dressing attachment for a hunting knife 1 is preferably fabricated from molded plastic, but other materials could also be used.

In use, a tip of the knife blade 102 is inserted into the tip cavity 20. A user's forefinger is inserted through the finger ring 18 and hooked around the finger ring 16 and the remainder of the user's hand is wrapped around a handle 104 of the knife 100. The handle 104 of the knife 100 is drawn against an opposing end of the support plate 10 by the forefinger, which results in the non-cutting edge of the knife blade 102 being retained in the blade groove 20. The forefinger also is used to keep the tip of the knife blade 102 in the tip cavity 20. The field dressing attachment for a hunting knife 1 is now ready for use for field dressing game, such as a deer.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A field dressing attachment for a hunting knife comprising:
   a support plate having means for retaining a knife blade, the knife is adapted to be positioned substantially parallel to and substantially above said support plate;
   a bottom gusset extends from at least a portion of a bottom of said support plate;
   a finger ring is disposed below said support plate at substantially one end of said support plate, said finger ring includes a finger opening; and
   an end projection extends from an opposing end of said support plate, a tip cavity is formed in said end projection, said tip cavity is sized to receive a tip of a knife blade.

2. The field dressing attachment for a hunting knife of claim 1 wherein:
   a front portion of said end projection is curved.

3. The field dressing attachment for a hunting knife of claim 1 wherein:
   at least a portion of said support plate has a width that is greater than a width of said gusset.

4. The field dressing attachment for a hunting knife of claim 1 wherein:
   said support plate supports the handle of the hunting knife.

5. The field dressing attachment for a hunting knife of claim 1 wherein:
   a pair of retention tabs extend upward from a top of said support plate, an inside surface of said pair of retention tabs are spaced to receive a thickness of a knife blade.

6. The field dressing attachment for a hunting knife of claim 1 wherein:
   said field dressing attachment, for a hunting knife is fabricated from a molded plastic material.

7. The field dressing attachment for a hunting knife of claim 1 wherein:
   each side of a front portion of said support plate is one of chamfered and curved.

8. A field dressing attachment for a hunting knife comprising:
   a support plate having a blade groove formed in a top thereof;
   a bottom gusset extends from at least a portion of a bottom of said support plate, a finger ring opening is formed through said bottom gusset, said finger ring opening is located substantially below a longitudinal axis of said support plate;
   and
   an end projection extends from an opposing end of said support plate, a tip cavity is formed in said end projection, said tip cavity is sized to receive a tip of a knife blade.

9. The field dressing attachment for a hunting knife of claim 8 wherein:
   a front portion of said end projection is curved.

10. The field dressing attachment for a hunting knife of claim 8 wherein:
    at least a portion of said support plate has a width that is greater than a width of said gusset.

11. The field dressing attachment for a hunting knife of claim 8 wherein:
    said support plate supports the handle of the hunting knife.

12. The field dressing attachment for a hunting knife of claim 8 wherein:
    a pair of retention tabs extend upward from a top of said support plate, an inside surface of said pair of retention tabs are spaced to receive a thickness of a knife blade.

13. The field dressing attachment for a hunting knife of claim 8 wherein:
    said field dressing attachment for a hunting knife is fabricated from a molded plastic material.

14. The field dressing attachment for a hunting knife of claim 8 wherein:
    each side of a front portion of said support plate is one of chamfered and curved.

15. A field dressing attachment for a hunting knife comprising:
    a support plate having a blade groove formed in a top thereof for retaining a knife blade;
    a pair of retention tabs extend upward from a top of said support plate, an inside surface of said pair of retention tabs are adjacent opposing sides of said blade groove;
    a bottom gusset extends from at least a portion of a bottom of said support plate;
    a finger ring is disposed below said support plate at substantially one end of support plate, said finger ring includes a finger opening; and
    an end projection extends from an opposing end of said support plate, a tip cavity is formed in said end projection, said tip cavity is sized to receive a tip of a knife blade.

16. The field dressing attachment for a hunting knife of claim 15 wherein:
    a front portion of said end projection is curved.

17. The field dressing attachment for a hunting knife of claim 15 wherein:
    at least a portion of said support plate has a width that is greater than a width of said gusset.

18. The field dressing attachment for a hunting knife of claim 15 wherein:
    said support plate supports the handle of the hunting knife.

19. The field dressing attachment for a hunting knife of claim 15 wherein:

said blade groove includes a straight section and a tapered section, one end of said tapered section extends from said straight section, the other end of said tapered section merges into a width of said tip cavity.

\* \* \* \* \*